United States Patent

[11] 3,584,223

| [72] | Inventors | Ralph E. Aldrich<br>Woburn;<br>William R. Buchan, Lincoln, both of, Mass. |
|---|---|---|
| [21] | Appl. No. | 801,598 |
| [22] | Filed | Feb. 24, 1969 |
| [45] | Patented | June 8, 1971 |
| [73] | Assignee | Itek Corporation<br>Lexington, Mass. |

[54] OPTICAL READOUT OF ELECTRIC FIELDS BY DETECTING REFLECTED AND/OR REFRACTED RADIATION WHICH IS INCIDENT WITHIN THE RANGE OF VARIATION OF THE CRITICAL ANGLE
23 Claims, 4 Drawing Figs.

[52] U.S. Cl. .................................................. 250/216,
350/160, 356/209, 356/211
[51] Int. Cl. .................................................. H01j 3/14
[50] Field of Search .................................................. 250/213,
216; 356/209, 211; 350/160

[56] References Cited
UNITED STATES PATENTS

| 3,238,296 | 3/1966 | Nelson et al. ................. | 350/160 |
| 3,238,843 | 3/1966 | Heller ........................... | 350/160 |
| 3,271,578 | 9/1966 | Bockemuehl .................. | 350/160 |
| 3,273,999 | 9/1966 | Clark ............................ | 350/160 |
| 3,278,749 | 10/1966 | Seidel ........................... | 350/160X |
| 3,307,897 | 3/1967 | Lohmann ..................... | 350/160 |
| 3,479,510 | 11/1969 | Baumberger et al. ........ | 250/213X |
| 3,485,553 | 12/1969 | Lee .............................. | 350/160 |
| 3,497,286 | 2/1970 | Morton et al. ................ | 350/160 |

OTHER REFERENCES

Fridkin, V. M. and Zheluder, I. S., " Photoelectrets and the Electrophotographic Process," Consultants Bureau, New York

*Primary Examiner*—James W. Lawrence
*Assistant Examiner*—C. M. Leedom
*Attorneys*—Homer O. Blair, Robert L. Nathans and David E. Brook

ABSTRACT: An apparatus and method are disclosed for reading out information represented by variations in the intensity of an electric field by sensing the variations in the intensity of radiation deflected from a boundary of an electro-optic medium whose index of refraction varies with variations in the intensity of an associated electric field.

PATENTED JUN 8 1971
3,584,223
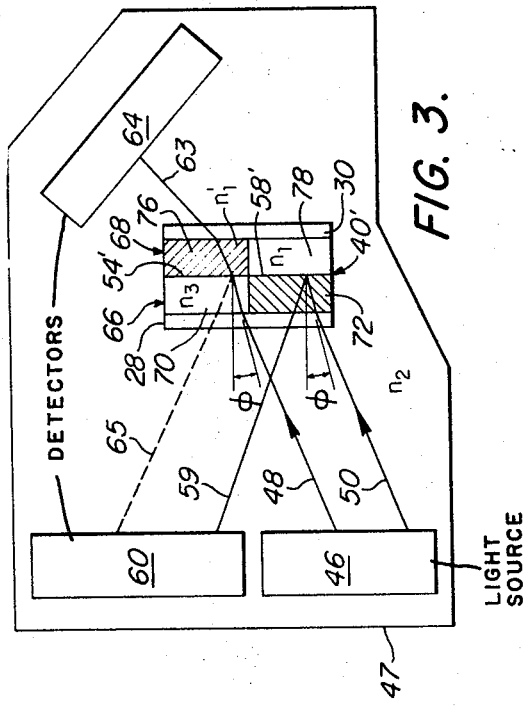
FIG. 3.
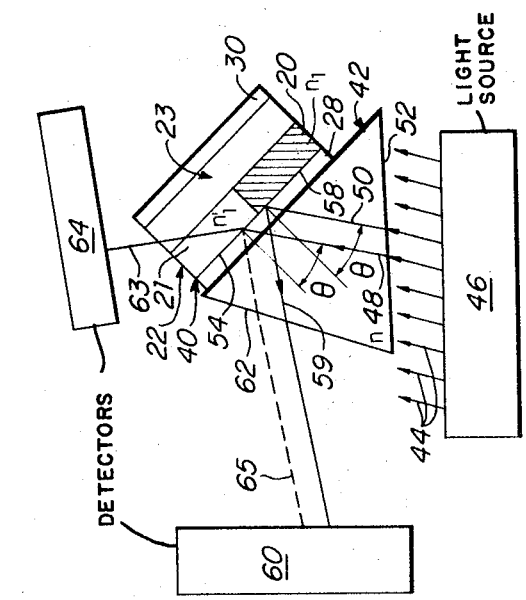
FIG. 4.
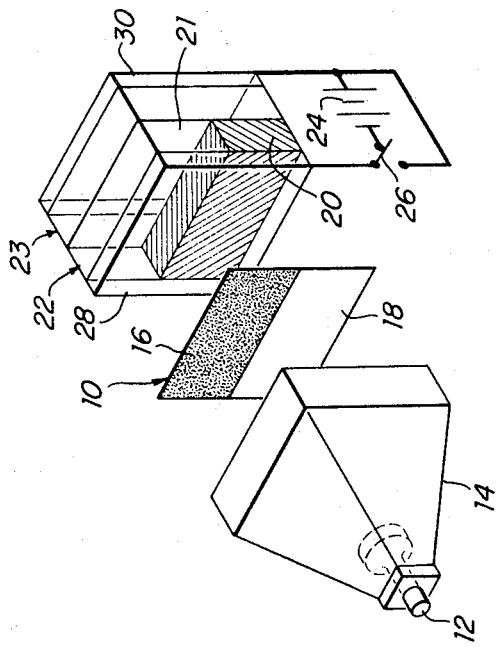
FIG. 1.
FIG. 2.
RALPH E. ALDRICH
WILLIAM R. BUCHAN
INVENTORS.
BY
Joseph S. Sandiorio
ATTORNEY.

1

OPTICAL READOUT OF ELECTRIC FIELDS BY DETECTING REFLECTED AND/OR REFRACTED RADIATION WHICH IS INCIDENT WITHIN THE RANGE OF VARIATION OF THE CRITICAL ANGLE

CHARACTERIZATION OF INVENTION

The invention is characterized in an apparatus for reading out information present in the form of variations in the intensity of an electric field comprising: an electro-optic medium whose index of refraction varies as a function of the intensity of an associated electric field; means for associating an electric field in which information is present in the form of variations in the electric field intensity with the electro-optic medium; means for exposing a boundary of the electro-optic medium to readout-radiation at a predetermined angle of incidence within the range of variation of the critical angle, at the boundary, producible by the influence of the electric field on the index of refraction of the electro-optic medium; and means for sensing variations in the intensity of radiation deflected by the boundary to distinguish variations in the index of refraction of the electro-optic medium representative of the intensity pattern present in the electric field.

BACKGROUND OF INVENTION

This invention relates to optical readout of information present in the form of variations in the intensity of an electric field, and more particularly to the sensing of changes in the intensity of the radiation reflected and/or refracted from a boundary of an electro-optic medium as a result in shifts of the critical angle at that boundary due to variations in the index of refraction of the electro-optic medium as a function of an associated electric field.

Information may be present in the form of variations in the intensity of an electric field momentarily, as in the case of image intensifying or converting operations or for longer periods, as in the case of information stored in electric fields by means of semiconductors, ferroelectric materials or photoelectrets. There are a number of advantages in representing information in the form of variations in the intensity of an electric field. For example, many discrete information bit locations may be contained in a very small area and no moving parts are required. But quick, efficient readout of information in the form of variations of the intensity of an electric field presents new problems because of the very small energy levels involved. For example, when the information present in the field is read out directly, electrically, low signal-to-noise ratios often occur rendering the output signal nearly useless.

SUMMARY OF INVENTION

Thus it is desirable to have available a new method and apparatus for optical readout of information present in the form of variations in the intensity of an electric field.

It is also desirable to have available such a method and apparatus in which the electric field is associated with a semiconductor medium or a ferroelectric medium.

It is also desirable to have available such a method and apparatus which uses an electro-optic medium whose index of refraction varies as a function of intensity of an associated electric field.

It is also desirable to have available such a method and apparatus in which the readout radiation is incident on a boundary of the electro-optic medium at an angle in the range of variation of the critical angle of that boundary producible by the variations in the index of refraction of the electro-optic medium under the influence of an associated electric field.

The invention may be accomplished by apparatus for reading out information present in the form of intensity variations of an electric field including an electro-optic medium whose index of refraction varies as a function of an applied electric field. Means are provided for associating such an electric field in which information is present with an electro-optic medium. There are means for exposing a boundary of the electro-optic medium to radiation at a predetermined angle of incidence to the boundary and within a range of variation of the critical angle at that boundary. The range of variation of the critical angle is that range through which the critical angle may be varied as a result of variations in the index of refraction of the electro-optic medium caused by variations in the intensity of the associated electric field. Means for sensing variations in the intensity of radiation deflected by the boundary are provided to distinguish variations in the index of refraction of the electro-optic medium representative of the pattern present in the electric field.

DISCLOSURE OF PREFERRED EMBODIMENTS

Other objects, features, and advantages will occur from the following description of preferred embodiments and the accompanying drawings, in which:

FIG. 1 is an axonometric diagram of apparatus for storing information in an electric field associated with an electro-optic, photoconductor medium accompanied by a blocking layer;

FIG. 2 is a diagram of apparatus for reading out information present in an electric field in the form of variations of the field intensity by using the effect of the variations of intensity of the electric field on the index of refraction of an electro-optic, photoconductor medium accompanied by a blocking layer according to the invention;

FIG. 3 is a diagram of apparatus similar to that of FIG. 2 but substituting a photoconductor layer and a ferroelectric, electro-optic layer for the electro-optic, photoconductor layer and blocking layer, respectively, of FIG. 2;

FIG. 4 is a diagram of apparatus similar to that of FIG. 2 for performing a serial readout of the information present in the electric field.

The invention may be embodied in apparatus for reading out information contained in the pattern of intensity variations of an electric field by sensing the variations in the reflection and/or refraction of radiation at a boundary of an electro-optic medium associated with the electric field. Variations in the intensity of the electric field cause variations in the index of refraction of the electro-optic medium resulting in variations in the critical angle at the interface. The interface is irradiated with radiation incident at the boundary at a predetermined angle which may be equal to, greater than, or less than the critical angle at the highly charged, low charged or uncharged portions of the boundary. That is, the readout radiation is incident on the boundary at an angle which is within the range of the values of the critical angle producible by the influence of the electric field on the index of refraction of the electro-optic medium. Either all the radiation deflected by the boundary or just the portion reflected or just the portion refracted may be sensed as a representation of the variation of the intensity of the electric field. The readout may be performed serially, as for example by scanning the electro-optic medium with a beam of radiation, or in parallel, as for example by irradiating the whole boundary of the electro-optic medium at once.

The associated electric field read out by means of this invention may be present as a surface charge on the electro-optic medium, as an internal electric field or as an external electric field. Further, the field may be stored, as for example by persistent internal polarization, or may be momentary, as occurs when the device is used as a camera or image intensifier or converter.

This invention may be embodied in cameras, storage devices, image intensifiers, and other devices capable of representing information in the form of variations of intensity of an electric field, and may be applied to read out electric fields such as those associated with a moving electron beam or dielectric storage tapes. The electro-optic material whose index of refraction varies under the influence of an electric field and whose variation in index of refraction is used to read out the information in the electric field may be employed in various configurations. For example, an electro-optic layer of material such as KDP may be associated with a photosensitive semiconductor, i.e. photoconductor, layer of material such as CdS; or one layer may be an electro-optic, semiconductor material such as ZnS which exhibits both characteristics, and the second layer may be an electrically inactive or blocking charge storage layer such as polystyrene; or one layer may be a layer of electro-optic, ferroelectric material such as Pb(Zr,Ti)O$_3$ or LiNbO$_3$, and the second layer may be a photoconductor such as CdS.

One of the layers in such a device should function as a blocking layer to prevent charges which penetrate the photoconductor material in radiation-struck areas from reaching the opposite electrode: the blocking layer, which may be a dielectric material or some other electrically inactive substance, provides a charge distribution across the device as a result of the radiation incident on the photoconductor subject to the electric field across the electrodes. When the photoconductor layer and electro-optic or ferroelectric layers are separate, the electro-optic or ferroelectric layer may perform the blocking function. But when the electro-optic or ferroelectric material is in a layer with the photoconductor, a separate blocking layer is used.

Various arrangements may be used in accordance with this invention to read out electric fields. The electro-optic medium may be associated with a medium of higher refractive index so that when the readout radiation is incident at the interface or boundary at an angle greater than the critical angle, internal reflection occurs in the medium of higher refractive index. Alternatively, the electro-optic medium may be associated with a medium of lower refractive index so that when the readout radiation is incident at the interface or boundary at an angle greater than the critical angle, internal reflection occurs in the electro-optic medium.

The electro-optic medium used may be one in which the refractive index increases with increases in the intensity of the associated electric field or may be one in which the refractive index decreases with increases in the intensity of the associated electric field.

The invention may be practiced by operating at the critical angle, above the critical angle, or below the critical angle. That is, the readout radiation may be incident at an angle equal to the critical angle of the electro-optic device in a predetermined state of charge varying from zero charge to fully charged, or less than or greater than that critical angle. When operating at the critical angle, the system operates as a threshold device, i.e. any change in the index of refraction of the electro-optic device switches the deflected radiation from a partial reflection, partial refraction state to a total reflection state or vice versa. When the angle of incidence of the readout radiation is greater than the critical angle, no change in the ratio of reflected to refracted radiation occurs until the change in the index of refraction is sufficient to shift the critical angle to a value greater than that of the angle of incidence of the readout radiation. When the angle of incidence is less than the critical angle of the electro-optic medium but lies in the range where the percentage of reflected radiation increases rapidly with increase in the angle of the incident radiation the readout system may be operated as an analog detector as opposed to the digital or thresholding nature of the system when it is operated at or beyond the critical angle.

The readout radiation need not be polarized though in preferred embodiments radiation vibrating in a plane parallel to the plane of incidence is used.

An information pattern in the form of an image may be stored by means of an internal electric field in a device having an electro-optic, photoconductor layer, such as ZnS, and a blocking layer of polystyrene or some other suitable dielectric material, as shown in FIG. 1. Storage is accomplished by exposing transparency 10 to radiation from lamp 12 in hood 14. Radiation is essentially blocked by the more dense upper section 16 but is transmitted by the less dense lower section 18 of transparency 10. As a result the lower section 20 of electro-optic, photoconductor layer 22 becomes more conductive than upper section 21. Therefore, the external electric field provided by battery 24 through switch 26 across electrodes 28 and 30 establishes an internal electric field across layer 22 and blocking layer 23 which varies in a pattern representative of the density pattern or image of transparency 10 projected on layer 22: the electric field across lower section 20 is of lower strength than that across upper section 21. And this difference in field strength causes the index of refraction of the electro-optic material in layer 22 to vary in a pattern similar to the image projected on it.

In the embodiment of FIG. 2, information stored in the internal electric field associated with an electro-optic medium whose index of refraction increases with increases in intensity of an applied electric field is read out by associating that medium with a medium of higher refractive index and using readout radiation incident on the interface between the electro-optic medium and the medium of higher refractive index at the critical angle of the interface in areas where the electro-optic medium is in a low charge condition. Electrode 28 must either be less than 100 A thick if a metal or have a refractive index greater than that of the electro-optic medium to prevent electrode 28 from interfering with the readout radiation. For purposes of illustration the optical effect of electrode 28 is neglected and layer 22 is assumed to have a boundary or interface 40 with prism 42. Polarized radiation 44 from source 46 is projected into prism 42. Only two radiation rays 48 and 50 are shown actually entering prism 42; They are bent towards the normal to surface 52 since prism 42 has a higher refractive index $n$ than the air at surface 52. At interface 40 rays 48 and 50 are incident at an angle $\theta$. Ray 50 is incident on the portion 58 of interface 40 proximate the less charged section 20 of layer 22, and ray 48 is incident on the portion 54 of interface 40 proximate the highly charged section 21 of layer 22. In the highly charged condition layer 22 has an index of refraction $n'_1$ but in the lesser charged condition, it has a different index of refraction $N_1$. Thus, section 21 has an index of refraction $n'_1$ and section 20 has an index of refraction $n_1$. Prism 42 is chosen to have an index of refraction $n$ which is larger than either $n_1$ or $n'_1$ so that reflection will take place within the prism. In addition, $n$ and $\theta$ are chosen to result in a critical angle close to $\theta$ at either of the portions 54 and 58 of interface 40. In FIG. 2 $n$ and $\theta$ are selected to establish a critical angle $\theta_{c_a}$ at portion 58 proximate less charged section 20.

The selection of $n$ and $\theta$ are made in accordance with Snell'law low of refraction:

$$(1) \quad n \sin \theta = n_1 \sin \theta',$$

where $\theta'$ is the angle of refraction at the less charged section 20. The critical angle $\theta_{c_a}$ for total internal reflection in the prism having the refractive index $n$ at the interface 40 at portions 58 near less charged section 20 may be found by setting $\theta'$ equal to 90° so that:

$$(2) \quad \theta_{c_a} = \frac{\sin^{-1} n_1}{n}$$

In the embodiment of FIG. 2, the angle of incidence $\theta$ is selected to be equal to or greater than the critical angle $\theta_{c_a}$ for portion 58 as defined in equation (2) so that all radiation incident on portion 58 of interface 40 is totally internally reflected within prism 42 and directed, ray 59, to a detector 60 beyond surface 62 of prism 42.

The angle of refraction is $\theta''$ at more charged section 21 for a ray incident at $\theta$ at portion 54 of boundary 40. The difference between the indices of refraction $n$ of prism 42 and $n'_1$ of the more charged section 21 of layer 22 should define a critical angle $\theta_{c_b}$ such that:

$$(3) \quad \theta_{c_b} = \frac{\sin^{-1} n'_1}{n}$$

at portions 54 of the interface 40 proximate more charged section 21 of layer 22, which is greater than the angle of incidence $\theta$ of the radiation. That is:

$$(4) \quad \theta_{c_a} < \theta < \theta_{c_b}$$

and therefore:

(5) $\quad n'_1 > n_1$.

Thus, in the embodiment of FIG. 2 radiation incident at angle $\theta$ on interface 40 in areas proximate more charged section 21 of layer 22 is incident at an angle which is less than the critical angle $\theta_c$ and is partially refracted, ray 63, through layers 22 and 23 to detector 64 and partially reflected, ray 65, to detector 60.

Since each of detectors 60 and 64 receives radiation deflected by the interface 40, each is receiving radiation representative of the variation of the index of refraction and internal electric field associated with layer 22 and either one may be used alone to read out the information stored in that field. Detectors 60, 64 may be photosensitive film, electronic imaging tubes or any other device suitable for sensing the deflected radiation.

In FIG. 3 there is shown a device similar to that of FIG. 2 except that layer 22 is replaced by a photoconductor layer 66, blocking layer 23 is replaced by ferroelectric, electro-optic layer 68, and the exposing image was the opposite of the one provided by transparency 10, i.e. the upper portion of the image was bright and the lower portion was dark. In FIG. 3 like parts have been given like numbers, and parts similar to parts in FIG. 2 have been referred to with the same numbers primed. The device in FIG. 3 is not provided with an additional denser medium such as prism 42 because layer 66 is used as the denser medium in which the internal reflection takes place. The medium 47 in which source 46, detectors 60, 64, electrodes 28, 30 and layers 66, 68 are disposed has an index of refraction $n_2$ which is less than the index of refraction $n_3$ of photoconductor layer 66 and greater than the index of refraction of electro-optic, ferroelectric layer 68 in either its highly charged or less charged state, indices $n'_1$, $n_1$, respectively. Although the conductance of photoconductor layer 66 varies according to the intensity of incident radiation, the index of refraction of that layer does not: it is uniformly $n_3$.

Referring to Snell's law:

(6) $\quad n_3 \sin \Phi = n_1 \sin \Phi'$;

the critical angle $\phi_{c_a}$ for total internal reflection in layer 66 at portion 58' of interface 40' proximate less charged section 78 of layer 68 may be found by setting the angle $\Phi'$ equal to 90° so that:

(7) $\quad \phi_{c_a} = \dfrac{\sin^{-1} n_1}{n_3}$

The angle of incidence $\Phi$ in FIG. 3 is selected to be at the critical angle $\phi_{c_a}$ for portion 58' as defined in equation (7) so that all radiation incident on portion 58' of interface 40' subject to the electric field in the device is totally internally reflected within layer 66 and directed to detector 60, ray 59.

The angle of refraction is $\Phi''$ in section 70 for a ray incident at angle $\Phi$ at portion 54' of boundary 40' proximate highly charged section 76 of layer 68. The indices of refraction of section 76 of layer 68 and of layer 66, $n'_1$, $n_3$, respectively, define a critical angle $\phi_{c_b}$ such that:

(8) $\quad \phi_{c_b} = \dfrac{\sin^{-1} n'_1}{n_3}$ which is equal to more than the angle of incidence $\Phi$ of the radiation. That is:

(9) $\quad \phi_{c_a} < \phi \leq \phi_{c_b}$ and therefore:

(10) $\quad n'_1 > n_1$.

Serial readout may be accomplished by scanning the interface 40 of layer 22 through prism 42 with a narrow beam of radiation from scanning tube 80, FIG. 4. The electrode 28 is selected to not interfere with the radiation. Radiation reflected from interface 40 is collected by lens 82 and projected to a detector 84, which may be a photomultiplier tube, to provide an electrical signal whose amplitude is representative of the variations of the index of refraction and field of layer 22.

For clarity in this description the devices read out are storage devices and the images and patterns are simple ones: typically the patterns are of a more complex nature, such as pictures or a multiplicity of binary bits of information. The radiation used need not be polarized, may be of any suitable wavelength including visible light, and may be of a lower energy level than required to dissipate the field so that nondestructive readout is effected.

Other embodiments will occur to those skilled in the art and are within the following claims:

What we claim is:

1. Apparatus for reading out information present in the form of variations in the intensity of an electric field comprising:

an electro-optic medium whose index of refraction varies as a function of the intensity of an associated electric field;

means for producing an electric field across said electro-optic medium, said electric field having two dimensional variations in its intensity which are representative of an information pattern such that the index of refraction of said electro-optic medium is affected to be also representative of said information pattern.

means for exposing a boundary of said electro-optic medium to read out radiation at a predetermined angle of incidence within the range of variation in the critical angle, at said boundary, producible by the influence of said electric field on the index of refraction of said electro-optic medium; and, means for sensing variations in the intensity of radiation deflected by said boundary to distinguish variations in the index of refraction of said electro-optic medium representative of the intensity pattern present in the electric field.

2. The apparatus of claim 1 in which said means for producing an electric field includes a semiconductor medium.

3. The apparatus of claim 1 in which said means for producing an electric field includes a ferroelectric medium.

4. The apparatus of claim 2 in which said semiconductor medium and said electro-optic medium are included in a material which exhibits the characteristics of both mediums.

5. The apparatus of claim 3 in which said ferroelectric medium and said electro-optic medium are included in a material which exhibits the characteristics of both mediums.

6. The apparatus of claim 1 in which said means for producing an electric field includes a photoelectret.

7. The apparatus of claim 1 in which said predetermined angle of incidence exceeds the critical angle at said boundary at an uncharged portion of said electro-optic medium.

8. The apparatus of claim 1 in which said predetermined angle of incidence is equal to the critical angle at said boundary at an uncharged portion of said electro-optic medium.

9. The apparatus of claim 1 in which said predetermined angle of incidence is less than the critical angle at said boundary at an uncharged portion of said electro-optic medium.

10. The apparatus of claim 1 in which said means for exposing includes a second medium having a higher index of refraction than said electro-optic medium and the internal reflection occurs at said boundary in said second medium.

11. The apparatus of claim 1 in which said means for exposing includes a second medium having a lower index of refraction than said electro-optic medium and the internal reflection occurs at said boundary in said electro-optic medium.

12. The apparatus of claim 1 in which said means for exposing includes a medium of higher refractive index than said electro-optic medium proximate said electro-optic medium for transmitting said readout radiation to said boundary.

13. The apparatus of claim 1 in which said electro-optic medium is one in which the index of refraction increases with increases in associated electric field intensity.

14. The apparatus of claim 1 in which said means for sensing includes means for detecting radiation reflected by said boundary.

15. The apparatus of claim 1 in which said means for sensing includes means for detecting radiation refracted by said boundary.

16. The apparatus of claim 1 in which said means for sensing includes means for detecting both radiation reflected and radiation refracted by said boundary.

17. The apparatus of claim 1 in which said means for exposing includes means for simultaneously irradiating all portions of said boundary to accomplish parallel readout of said semiconductor medium.

18. The apparatus of claim 1 in which said means for exposing includes means for successively irradiating portions of said boundary to accomplish serial readout of said semiconductor medium.

19. The apparatus of claim 1 in which said radiation with which said boundary is exposed is plane polarized.

20. The apparatus of claim 1 in which said means for producing an electric field includes an electrically inactive blocking layer.

21. A method of reading out information present in the form of variations in the intensity of an electric field comprising:
   associating the electric field whose intensity variations represent a pattern of information with an electro-optic medium whose index of refraction varies as a function of the intensity of an associated electric field,
   exposing a boundary of said electro-optic medium to readout radiation at a predetermined angle of incidence within the range of variation of the critical angle, at said boundary, which critical angle is producible by the influence of said electric field on the index of refraction of said electro-optic medium; and,
   sensing the intensity of radiation deflected by said boundary to distinguish variations in the index of refraction of said electro-optic medium representative of the intensity pattern present in the electric field.

22. The method of claim 21 in which sensing the radiation deflected by said boundary includes detecting the radiation reflected by said boundary.

23. The method of claim 21 in which sensing the radiation deflected by said boundary includes detecting the radiation refracted by said boundary.